United States Patent [19]

Weyer

[11] Patent Number: 4,953,586
[45] Date of Patent: Sep. 4, 1990

[54] APPARATUS FOR ADJUSTMENT OF ROTARY VALVE ACTUATORS

[76] Inventor: Paul P. Weyer, 48811 286th Ave. SE, Enumclaw, Wash. 98022

[21] Appl. No.: 465,437

[22] Filed: Jan. 16, 1990

[51] Int. Cl.[5] .................. F16K 43/00; F16K 31/16
[52] U.S. Cl. ................................ 137/315; 251/58; 251/292; 403/337
[58] Field of Search .............. 92/33; 137/315; 251/14, 251/58, 129.03, 129.11, 129.12, 291, 292; 403/337, 353

[56] References Cited

U.S. PATENT DOCUMENTS

| | | | |
|---|---|---|---|
| 2,284,070 | 5/1942 | Roof | 403/337 |
| 3,152,785 | 10/1964 | Zeitlin | 251/129.11 |
| 4,313,367 | 2/1982 | Weyer | 92/33 |
| 4,705,063 | 11/1987 | Robinson | 137/315 |
| 4,836,497 | 6/1989 | Beeson | 137/315 |
| 4,869,458 | 9/1989 | Susini et al. | 251/14 |

Primary Examiner—George L. Walton
Attorney, Agent, or Firm—Mark Zovko

[57] ABSTRACT

Apparatus for adjusting the fully open and fully closed positions of a system having a valve and a rotary valve actuator for controlling the opening and closing of the valve. A sub base is provided which serves as an adaptor and is fixedly mounted to the valve bonnet of a standard quarter turn valve. The sub base has threaded fasteners which fit through open or raised portions of a convoluted ring fixed to the actuator housing. A cover plate above the ring has holes to receive the studs and nuts or other suitable means are used to fasten the cover plate, convoluted ring, and sub base. The raised portions of the convoluted ring have pusher screws which push against the threaded fasteners of the base flange. Rotation of the convoluted ring and the actuator relative to the sub base can occur by selectively rotating the pusher screws thereby resulting in fine adjustment of the fully open and fully closed positions of the valve.

12 Claims, 2 Drawing Sheets

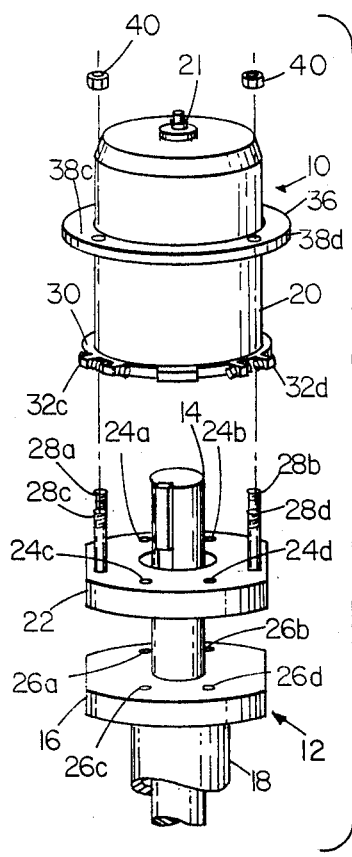
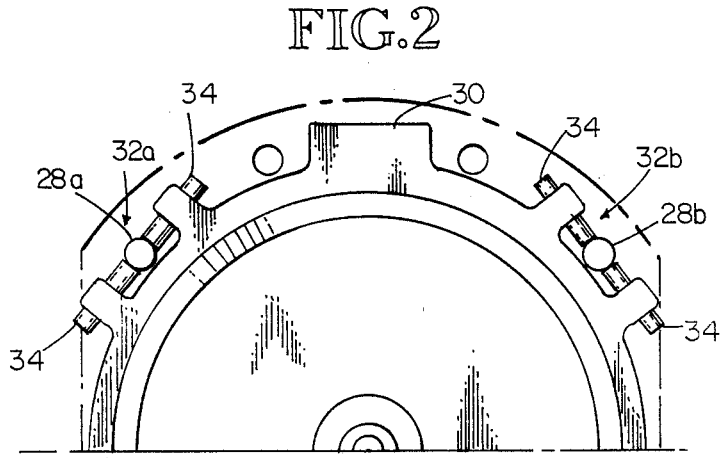
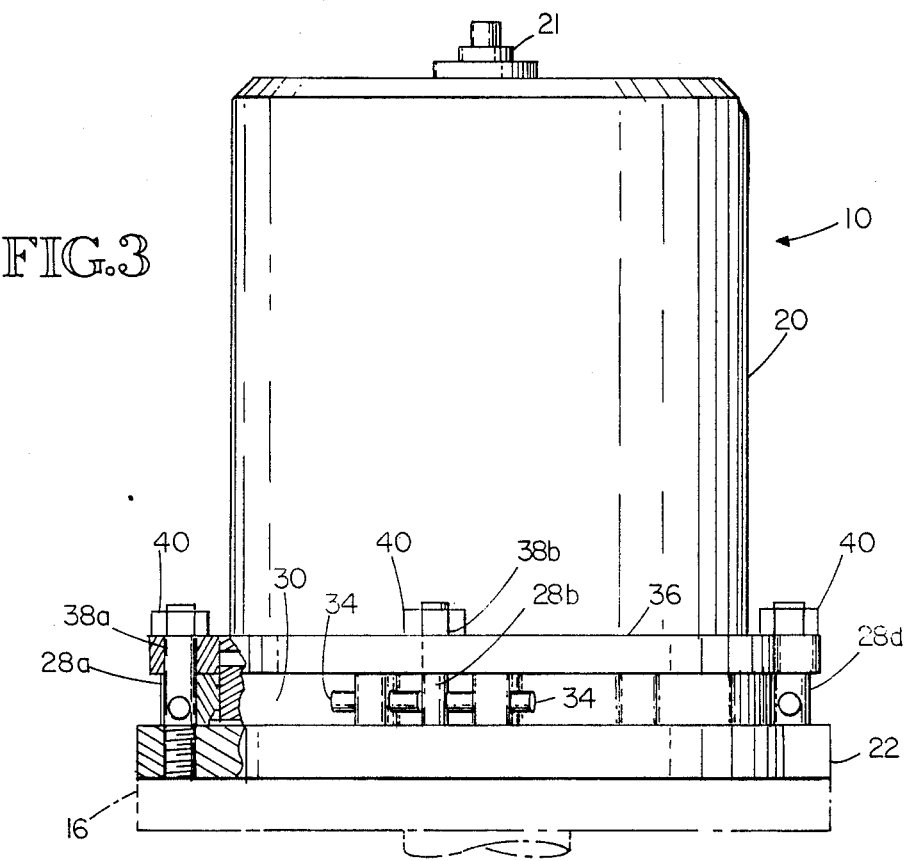

APPARATUS FOR ADJUSTMENT OF ROTARY VALVE ACTUATORS

DESCRIPTION

1. Technical Field

This invention relates in general to rotary valve actuators in which linear movement of a piston produces rotary movement of an output shaft which is coupled to a valve stem, and more particularly to the fine adjustment of a rotary actuator at the fully open and fully closed positions of the valve.

2. Background Art

Rotary helical actuators have been used in the past and offer the advantages of high-torque output from a simple piston and cylinder drive arrangement. Typically, there are only two moving parts in a rotary helical actuator. These parts are a piston sleeve assembly which rotates and reciprocates, and a shaft which only rotates. The shaft is coupled to a valve stem of a quarter turn valve. The piston sleeve assembly is hydraulically sealed against both the actuator housing and the shaft. Fluid pressure can be applied to alternate ports to stroke the piston sleeve assembly back and forth within the housing similar to the operation of a conventional hydraulic cylinder. As the piston sleeve assembly reciprocates, it also rotates. Helical splines on the outside diameter of the piston sleeve assembly engage stationary matching spline teeth on the inside of the housing to force rotation of the piston. At the same time, another set of helical splines of opposite hand on the inside diameter of the piston sleeve assembly engage mating teeth on the shaft forcing additional shaft rotation and consequently valve operation. One such actuator is shown on U.S. Pat. No. 4,313,367. A shortcoming of such actuators, however, is that when the actuator is fixed to a valve flange and the rotary motion on the output shaft is used to rotate a valve stem in a fluid control valve, the rotational end limits of the actuator do not always precisely correspond with the desired valve stem rotational end limits. Fine adjustment of the actuator with respect to the fully open and fully closed valve positions is usually required.

In the prior art, flanges integral with the actuator housing are used in conjunction with adjusting screws. The flanges form an opening through which studs from a valve bonnet may extend. The adjusting screws push against these studs, allowing slight rotation of the actuator housing relative to the valve bonnet when the valve is at the fully open or closed position to finely adjust the actuator to the valve. Typically, the studs from the valve bonnet are fastened to the actuator housing by nuts and washers over the studs once they are through the flanges. This system has several drawbacks which are important in many applications. The flanges used to receive the studs from the valve bonnet must be cast integral with the actuator housing or individually welded presenting a cost factor which becomes significant as the number of actuators needed increases. If the flanges are welded to the housing, obvious care must be taken to weld each flange at exactly the right location on the circumference of the actuator.

Further, in a system in which the actuator has flanges integral with the housing used in conjunction with mounting studs, problems with attaching the actuator to the valve bonnet may arise. Typically using lock washers and nuts to secure the actuator to the valve can product a less than perfect attachment, as the washers may deflect during tightening of the nuts even if care is taken.

The present invention overcomes the above drawbacks and also has other advantages.

DISCLOSURE OF THE INVENTION

Apparatus for adjusting the fully open and fully closed positions of a system having a valve and a rotary valve actuator for controlling the opening and closing of the valve in herein disclosed. A sub base or base flange is provided, if required, which is mounted fixedly to the valve bonnet of a standard quarter turn valve. The base flange has threaded fasteners such as studs which extend from its upper surface. It should be noted that in some cases the sub base can be eliminated with the studs connecting the valve bonnet and actuator directly if the valve bonnet and actuator are suitably matched. In either case, the studs fit through open or raised portions of a convoluted ring. The convoluted ring is fixed to the circumference of the actuator housing. A cover plate above the convoluted ring has holes which receive the studs from the base flange. The cover plate fits around the actuator housing as does the convoluted ring, but the cover plate is not fixed to the actuator. Fasteners such as standard nuts are used to fasten the cover plate and convoluted ring to the base flange by way of the studs. Adjustment of the actuator is accomplished by means partially disposed within the convoluted ring. The raised portions of the convoluted ring have a pair of pusher screws threaded therethrough which push against the studs of the base flange. Rotation of the convoluted ring and the actuator relative to the base flange thereby occurs resulting in fine adjustment of the fully open and fully closed postions of the valve.

A first set of adjusting screws can rotate the convoluted ring and actuator in a clockwise direction relative to the base flange, and correspondingly a second set of adjusting screws can effect a counterclockwise rotation, if necessary. During adjustment of the valve, the nuts on the studs are loosened to allow the appropriate movement of the actuator and ring and after adjustment occurs these nuts are tightened.

BRIEF DESCRIPTION OF THE DRAWINGS

FIG. 1 is an exploded pictorial view of a system having a valve, valve actuator and adjusting apparatus of the present invention.

FIG. 2 is a top view of the convoluted ring used in the present invention.

FIG. 3 is a partially sectioned elevation view of the rotary actuator, valve and adjusting apparatus in accordance with the present invention.

BEST MODE FOR CARRYING OUT THE INVENTION

Figure 4:
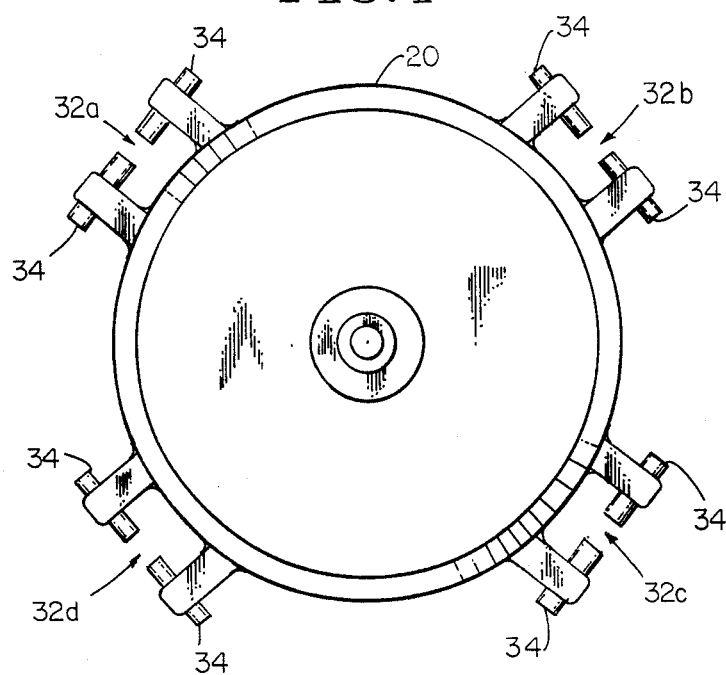
FIG. 4 is a top view of an actuator housing with raised flanges attached to the housing used in accordance with the present invention.

Referring to the Figures, a rotary actuator generally designated as 10 is shown. Rotary actuator 10 is to be used in conjunction with a valve generally designated as 12 to control the opening and closing of valve 12. Typically, valve 12 is a quarter turn valve moving from a fully open position to a fully closed position in substantially ninety degrees. Valve 12 has a valve stem 14, valve bonnet 16, and valve neck 18, and is only partially shown in the drawings. The actuator 10 provides a rotational drive to the valve 12 through valve stem 14. It should be noted that use of the present invention allows mounting of the adjustment apparatus and actuator to a variety of valve bonnets.

The actuator 10 has a housing 20 which is generally cylindrical in configuration. Mounted on the top of housing 20 is a valve position indicator 21. Not shown in the Figures are the internal workings of the actuator as the various components are well known in the art. It is sufficient to say that the actuator 10 is coupled to the valve stem 14 by an internal hollow shaft (not shown) keyed to the valve stem rotationally directing the valve stem. Fitting over valve stem 14 is a sub base or base flange 22. Base flange 22 has a series of holes 24a, 24b, 24c and 24d which correspond to holes in the valve bonnet 26a, 26b, 26c and 26d. The holes in the base flange 22 are either threaded or drilled and counterbored. It would be desirable to have threaded holes 24a, 24b, 24c and 24d when the holes 26a, 26b, 26c and 26d in the valve bonnet 16 are through holes. In this case, bolts (not shown) would be inserted through the holes in the valve bonnet 16 and threaded into the holes of the base flange 22. Alternatively, if the valve bonnet 16 has tapped holes 26a, 26b, 26c and 26d, the holes in the base flange 22 would be drilled and counterbored to receive socket head cap screws which could thread into the holes in the valve bonnet 16. In either case, suitable fastening occurs with flush mounting of the base flange 22 to valve bonnet 16.

Figure 5:
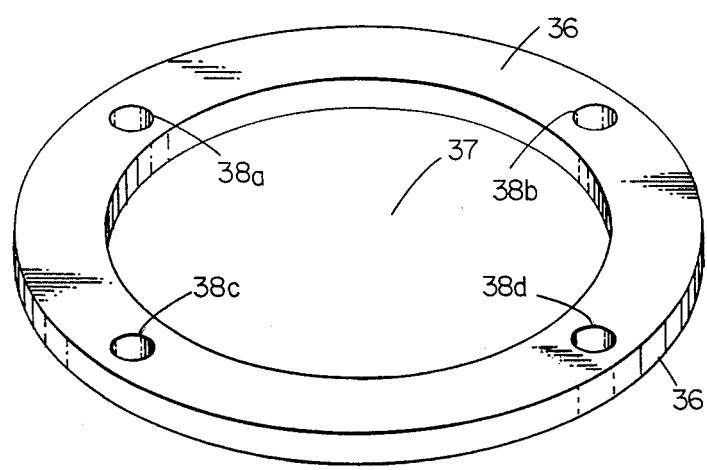
FIG. 5 is a pictoral view of the cover plate of the present invention.

Base flange 22 has mounting studs 28a, 28b, and 28c and 28d extending from its upper surface. In place of studs, it can be seen that other suitable threaded fasteners such as screws could be used with obvious minor modifications. The description will continue using studs as a preferable threaded fastener, although not the exclusive means for fastening. A convoluted ring designated as 30 is provided which is welded to the actuator housing 20. Convoluted ring 30 has open or raised portions 32a, 32b, 32c and 32d which receive the corresponding mounting studs 28a, 28b, 28c or 28d. Within the raised portions of the convoluted ring 30 are pusher screws generally designated as 34. These screws can push against the studs and rotate the actuator housing 20 relative to the base flange 22. Convoluted ring 30 is fixed to the circumference of the actuator housing 20 by welding or the like. Fitting over the convoluted ring 30 is a cover plate 36 having holes therein designated 38a, 38b and 38c to receive the mounting studs 28a, 28b and 28c, respectively. Nuts 40a, 40b and 40c are provided which when tightened on the mounting studs fasten the base flange 22, the convoluted ring 30 and the cover plate 36. Cover plate 36, as shown best in FIGS. 1, 3 and 5, is a key element of the invention. Cover plate 36 is continuously round having a large circular opening 37 adapted to fit over the actuator housing 20 and smaller holes 38a, 38b, 38c and 38d which receive the mounting studs 28a, 28b, 28c and 28d, respectively. Cover plate 36 is of uniform thickness both in the longitudinal and radial directions. Nuts 40 are provided which when tightened on the mounting studs fasten the base flange, the convoluted ring, and the cover plate 36. It should be noted that the cover plate offers superior support when compared to using conventional lock washers with nuts 40. Use of cover plate 36 results in a more secure fastening of the actuator 10 to the valve 12 which will not weaken with frequent usage or the passage of time.

It should be noted that in some applications the valve bonnet 16 may be of such a configuration that sub base 22 will not be required. In this case, the studs would extend directly from the valve bonnet 16 and connect the actuator housing 20 to the valve 12. The sub base 22 is used as an adaptor when the valve bonnet 14 and convoluted ring 30 are not suitably matched for direct connection. If the valve bonnet 14 and ring 30 are suitably matched for direct connection by mounting studs, sub base 22 can be eliminated.

To adjust the fully closed position of the valve, the following procedure can be used. Turn the valve 12 to the fully closed position and loosen nuts 40. Rotate the actuator housing 20 and convoluted ring 30 relative to the base flange 22 by tightening the appropriate pusher screws against the mounting studs 28a, 28b, 28c and 28d. If clockwise rotation is desired, for example, the pusher screws 34 which are pointing counterclockwise within the raised portions of the convoluted ring 30 should be tightened against the mounting studs. If counterclockwise rotation is desired, the screws 34 pointing in a clockwise direction should be tightened. The range of effective adjustment is ±5 degrees of rotation. After adjustment in either the fully open or closed valve position, nuts 40 should be appropriately tightened.

The invention may be embodied in other forms without departing from the spirit or essential characteristics thereof. The present embodiments are therefore to be considered in all respects as illustrative and not restrictive, the scope of the invention being indicated by the appended claims rather than the foregiong description, and all change which comes within the meaning and range of equivalency of claims is intended to be embraced therein.

What I claim is:

1. In a system having a valve with open and closed positions, and a rotary valve actuator for controlling the opening and closing of the valve, apparatus for adjusting the fully open and fully closed positions of the valve comprising
   a. a sub base having an upper surface and a lower surface, said sub base mounted to the valve, said sub base having threaded fasteners extending from the upper surface;
   b. ring means fixedly attached to the actuator around the circumference of the actuator, said ring means having open portions for allowing passage of said threaded fasteners of said sub base therethrough;
   c. a cover plate fitting around the actuator and resting on said ring means, said cover plate having holes to receive said threaded fasteners of said sub base;
   d. fastening means compatible with said threaded fasteners for fastening said cover plate to said threaded fasteners of said sub base;
   adjusting means within said ring means for rotating said ring means and the actuator relative to the sub base, said adjusting means is selected to abut against said fastening means causing said ring rotation thereby allowing fine adjustment of the fully open and fully closed positions of the valve.

2. The apparatus of claim 1 wherein said adjusting means includes adjustment screws which can push against said threaded fasteners of said sub base thereby causing rotation of said ring means and the actuator relative to the sub base thereby allowing fine adjustment of the fully open and fully closed positions of the valve.

3. The apparatus of claim 2 wherein said adjustment screws include first adjustment screws for effecting a counterclockwise rotation of said ring means and actuator relative to said sub base and second adjustment screws for effecting a clockwise rotation of said ring means and actuator relative to said sub base.

4. In a system having a valve with open and closed positions, and a rotary valve actuator for controlling the opening and closing of the valve, apparatus for adjusting the fully open and fully closed positions of the valve comprising
 a. a sub base having an upper surface and a lower surface, said sub base mounted to the valve, said sub base having threaded fasteners extending from the upper surface;
 b. ring means fixedly attached to the actuator around the circumference of the actuator, said ring means having open portions for allowing passage of said threaded fasteners of said sub base therethrough;
 c. fastening means compatible with said threaded fasteners for fastening said ring means to said threaded fasteners of said sub base;
 d. adjusting means within said ring means for rotating said ring means and the actuator relative to the sub base, said adjusting means is selected to abut against said fastening means causing said ring rotation thereby allowing fine adjustment of the fully open and fully closed positions of the valve.

5. The apparatus of claim 4 wherein said adjusting means includes adjustment screws which can push against said threaded fasteners of said sub base thereby causing rotation of said ring means and the actuator relative to the sub base thereby allowing fine adjustment of the fully open and fully closed positions of the valve.

6. The apparatus of claim 5 wherein said adjustment screws include first adjustment screws for effecting a counterclockwise rotation of said ring means and actuator relative to said sub base and second adjustment screws for effecting a clockwise rotation of said ring means and actuator relative to said sub base.

7. In a system having a valve with open and closed positions, and a rotary valve actuator for controlling the opening and closing of the valve, apparatus for adjusting the fully open and fully closed positions of the valve comprising
 a. a sub base having an upper surface and a lower surface, said sub base mounted to the valve, said sub base having threaded fasteners extending from the upper surface;
 b. flanges fixedly attached to the actuator around the circumference of the actuator, said flanges allowing passage of said mounting studs of said sub base therethrough;
 c. a cover plate fitting around the actuator and resting on said flanges, said cover plate having holes to receive said mounting studs of said sub base;
 d. fastening means compatible with said threaded fasteners for fastening said cover plate to said threaded fasteners of said sub base;
 e. adjusting means partially disposed within said flanges for rotating the actuator relative to the sub base, said adjusting means is selected to abut against said fastening means causing said ring rotation thereby allowing fine adjustment of the fully open and fully closed positions of the valve.

8. The apparatus of claim 7 wherein said adjusting means includes adjustment screws which can push against said threaded fasteners of said sub base thereby causing rotation of the actuator relative to the sub base thereby allowing fine adjustment of the fully open and fully closed positions of the valve.

9. The apparatus of claim 8 wherein said adjustment screws include first adjustment screws for effecting a counterclockwise rotation of said actuator relative to said sub base and second adjustment screws for effecting a clockwise rotation of said actuator relative to said sub base.

10. In a system having a valve with open and closed positions, and a rotary valve actuator for controlling the opening and closing of the valve, apparatus for adjusting the fully open and fully closed positions of the valve comprising
 a. threaded fasteners extending from the valve;
 b. ring means fixedly attached to the actuator around the circumference of the actuator, said ring means having open portions for allowing passage of said threaded fasteners therethrough;
 c. a cover plate fitting around the actuator and resting on said ring means, said cover plate having holes to receive said threaded fasteners
 d. fastening means compatible with said threaded fasteners for fastening said cover plate to said threaded fasteners;
 e. adjusting means within said ring means for rotating said ring means and the actuator, said adjusting means is selected to abut against said fastening means causing said ring rotation thereby allowing fine adjustment of the fully open and fully closed positions of the valve.

11. The apparatus of claim 10 wherein said adjusting means includes adjustment screws which can push against said thread fasteners of the valve thereby causing rotation of said ring means and the actuator relative to the valve thereby allowing fine adjustment of the fully open and fully closed positions of the valve.

12. The apparatus of claim 11 wherein said adjustment screws include first adjustment screws for effecting a counterclockwise rotation of said ring means and actuator relative to the valve and second adjustment screws for effecting a clockwise rotation of said convoluted ring and actuator relative to the valve.

* * * * *